United States Patent
Welker-Muraguri et al.

(10) Patent No.: US 9,300,798 B1
(45) Date of Patent: Mar. 29, 2016

(54) CONTROLLED-ENVIRONMENT FACILITY INTERACTIVE VOICE RESPONSE SYSTEM FUNCTIONALITY FACILITATING REPETITION OF A LAST REQUESTED ACTION

(71) Applicant: Securus Technologies, Inc., Dallas, TX (US)

(72) Inventors: Katie Welker-Muraguri, Plano, TX (US); Matthew Smith, McKinney, TX (US); Mckenzie Ellis, Castle Rock, CO (US)

(73) Assignee: SECURUS TECHNOLOGIES, INC, Dallas, TX (US)

( * ) Notice: Subject to any disclaimer, the term of this patent is extended or adjusted under 35 U.S.C. 154(b) by 0 days.

(21) Appl. No.: 14/322,856

(22) Filed: Jul. 2, 2014

(51) Int. Cl.
*H04M 1/64* (2006.01)
*H04M 3/493* (2006.01)

(52) U.S. Cl.
CPC .................................... *H04M 3/493* (2013.01)

(58) Field of Classification Search
CPC ............ H04M 2201/40; H04M 1/271; H04M 3/53325; H04M 3/493
See application file for complete search history.

(56) References Cited

U.S. PATENT DOCUMENTS

| | | | |
|---|---|---|---|
| 2007/0041545 A1* | 2/2007 | Gainsboro | 379/188 |
| 2007/0047694 A1* | 3/2007 | Bouchard et al. | 379/67.1 |
| 2011/0317685 A1* | 12/2011 | Torgersrud | H04L 12/66 370/352 |
| 2014/0287715 A1* | 9/2014 | Hodge et al. | 455/406 |

* cited by examiner

*Primary Examiner* — Simon King
(74) *Attorney, Agent, or Firm* — Fogarty, L.L.C.

(57) ABSTRACT

An Interactive Voice Response system (IVR) may answer a call and recognize call origin identifying information associated with the call. Whereupon, the IVR may retrieve at least one category of action, with respect to a resident of a controlled-environment facility, last carried out by a caller associated with the call origin identifying information. The IVR may then present the calling party an option to carry out at least one action with respect to the resident of the controlled-environment facility corresponding to at least one category of at least one action last carried out by a caller associated with the call origin identifying information. The action may be depositing money to an account maintained for the benefit of the resident of the controlled-environment facility, retrieving and hearing current and/or changed information about the resident (such as from a controlled-environment facility management system), and/or the like.

22 Claims, 4 Drawing Sheets

CONTROLLED-ENVIRONMENT FACILITY INTERACTIVE VOICE RESPONSE SYSTEM FUNCTIONALITY FACILITATING REPETITION OF A LAST REQUESTED ACTION

TECHNICAL FIELD

This specification relates generally to systems and methods for providing information about a resident of a controlled-environment facility using Interactive Voice Response system (IVR) functionality; more specifically to controlled-environment facility IVR functionality facilitating repetition of a last requested action; and, more particularly to IVR functionality that remembers caller identifying information and provides information from a same category for a particular controlled-environment facility resident as previously requested by the caller and/or information about the resident that has changed.

BACKGROUND

Management and dissemination of information is typically at the forefront of the administrative burdens for controlled-environment facilities. Such controlled-environment facilities might include, by way of example, inmate facilities (e.g., municipal jails, county jails, state prisons, federal prisons, military stockades, juvenile facilities, and detention camps), or hospitals, nursing homes, camps, schools, and the like. In one example, according to the International Centre for Prison Studies, the United States has the highest prison population per capita in the world. In 2009, for example, 1 out of every 135 U.S. residents was incarcerated. In such correctional facilities a great number of questions, commonly from a number of telephone calls may be directed to the facility's booking personnel, asking for details related to an inmate and his or her circumstances. Over the past several years, the sharp increase in the U.S. inmate population has not been followed by a proportional increase in the number of prison or jail staff. To the contrary, budget pressures in local, state, and federal governments have made it difficult for correctional facilities to maintain an adequate number of wardens, officers, and other administration personnel.

Friends, family or other constituents of a resident may call the facility looking for information related to a resident. Such calls have traditionally been taken by facility personnel who may have some booking information on the inmate. However, currently calls may be directed by an Interactive Voice Response system (IVR) to access electronically stored information. In existing controlled-environment facility IVRs, touch tone and/or speech recognition driven menus may allow friends, family members or other constituents of controlled-environment facility residents to speak the name of a resident and/or a type of facility policy, to self-service themselves without controlled-environment facility staff assistance. For example, a caller to a city or county jail may be presented with options such as "press 1 for inmate booking information, press 2 for facility hours, press 3 for visitation hours . . . ," "say one of the following options: inmate booking information, facility hours, visitation hours . . . ," and/or the like. These IVR systems ease administrative burdens on facility personnel. This frees significant numbers of staff hours for other tasks, allows staff members to focus on critical tasks without distractions, improves work atmosphere and staff morale, and gives citizens relatively faster access to information. Additionally, the time outside service providers spend on the telephone with the facility can be considerably minimized. For example, if an attorney calls a city or county jail to set up an appointment with an inmate, the attorney may be able to navigate the IVR system to gather scheduling information and schedule a meeting with the inmate. Further, such an IVR may be linked to other facility management functionality, enabling a function to be carried out by the calling party electronically, such as prearranging visitation, making commissary or trust account deposits, ordering, refilling prepaid calling cards for a resident, providing credit card information for use in funding commissary accounts, managing debit or other accounts, and/or the like.

However, when a constituent calls into a controlled-environment facility IVR the first portion of the telephone call is typically spent on "lead-in" questions such as the name of the individual calling, identification of the resident the call concerns, etc. Hence, the constituent must typically navigate a series of prompts in order to find resident information and/or fund a phone account, resident debit account, trust account, and/or the like maintained by the controlled-environment facility for the benefit of the resident. This can be quite time consuming, particularly when a caller finds it necessary to call multiple times a day to inquire as to whether or not resident information has been updated, for example.

SUMMARY

The present invention is directed to system and method embodiments, which provide a controlled-environment facility Interactive Voice Response system (IVR) functionality that may answer a call and recognize call origin identifying information associated with the call. Whereupon, the controlled-environment facility IVR may retrieve at least one category of action with respect to a resident of a controlled-environment facility last carried out by a caller associated with the call origin identifying information. The controlled-environment facility IVR may then present the calling party an option to carry out at least one action with respect to a resident of a controlled-environment facility, corresponding to at least one category of at least one action last carried out by a caller associated with the call origin identifying information. For example, the action may be retrieving and hearing current information about the resident, such as may be retrieved from a controlled-environment facility management system, or the like. As another example, the action may be depositing money to an account maintained for the benefit of the resident of the controlled-environment facility.

In accordance with various other embodiments of the present systems and methods, an IVR may answer a call and recognize call origin identifying information associated with the call. Whereupon, the IVR may retrieve at least one category of information last requested about a resident of a controlled-environment facility by a caller associated with the call origin identifying information, and present the calling party an option to hear current information about the resident of the controlled-environment facility corresponding to the category(s) of information last requested and/or resident information that has changed since a last call associated with the call origin identifying information. Thereafter, the current information and/or resident information that has changed may be presented to the calling party by the IVR, such as in response to selection of the option to hear current and/or changed information about the resident of the controlled-environment facility, in such embodiments. The current information about the resident of the controlled-environment facility and/or resident information that has changed since a last call may be retrieved by querying a controlled-environment facility management system for the current and/or changed information. Such embodiments may additionally or alternatively present the calling party an option to use the IVR's recognition system to request other information from at least one category of information, such as in response to selection of an option to not hear current information about the resident of the controlled-environment facility. Additionally or alternatively, such embodiments may present the calling party an option to carry out at least one action corresponding to at least one category of actions last carried out by a caller associated with the call origin identifying information, such as by way of example depositing money to an account maintained for the benefit of the resident of the controlled-environment facility.

In accordance with various other embodiments of the present systems and methods, a call is answered using an IVR and the IVR recognizes call origin identifying information associated with the call. Whereupon, the IVR retrieves current information about a resident of a controlled-environment facility corresponding to at least one category of information last requested by a caller associated with the call origin identifying information and/or resident information that has changed since a last call associated with the call origin identifying information. As noted, retrieving such current and/or changed information about the resident of the controlled-environment facility may comprise querying a controlled-environment facility management system for the current and/or changed information. In some embodiments, before, or after, retrieving the current and or changed information, the calling party may be offered an option to hear the current and/or changed information, afforded an option to use the interactive voice recognition system to request other information from at least one category of information, and/or an option to use the interactive voice recognition system to carry out at least one action not previously carried out by the party. The IVR may then, or at anytime, present the current and/or changed information to the party. The IVR may, additionally or alternatively, present the call party an option to carry out actions corresponding to at least one category of actions last carried out by a caller associated with the call origin identifying information, such as an option to deposit money to an account maintained for the benefit of the resident.

In accordance with various versions of the above embodiments of the present systems and methods, the controlled-environment facility may be a detention facility, the controlled-environment facility management system may be a detention facility management system (JMS) and the resident may be an inmate. In such embodiments, the retrieved information may be from at least one category including inmate charges, inmate bond amount, inmate bond type, inmate warrant, inmate hold, inmate visitation times, inmate approved visitors, inmate court date, inmate court time, inmate court location, inmate projected release date, inmate identification information, directions to the facility, location of the facility, facility policies for sending mail, facility procedures for sending money, inmate telephone account status, inmate telephone account usage, facility visitation policy, facility inmate property storage information, frequently requested phone numbers, and/or the like.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

This specification discloses systems and methods for providing information about a resident of a controlled-environment facility using Interactive Voice Response system (IVR) functionality, more specifically controlled-environment facility IVR functionality facilitating repetition of a last requested action. In particular, IVR functionality that remembers caller identifying information and provides information from a same category for a particular controlled-environment facility resident as previously requested by the caller, or the like, is disclosed. For example, in accordance with embodiments of the present systems and methods, an IVR may answer a call and recognize call origin identifying information associated with the call. Whereupon, the IVR may retrieve at least one category of action, with respect to a resident of a controlled-environment facility, last carried out by a caller associated with the call origin identifying information. The IVR may then present the calling party an option to carry out at least one action with respect to the resident of the controlled-environment facility corresponding to at least one category of at least one action last carried out by a caller associated with the call origin identifying information. The action may be depositing money to an account maintained for the benefit of the resident of the controlled-environment facility, retrieving and hearing current information from a controlled-environment facility management system about the resident, leaving a voicemail for the resident, and/or the like.

Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of correctional facilities, or the like. For instance, in some of the embodiments discussed below, a controlled-environment facility may be referred to as a jail or prison, and its residents may be referred to as arrestees, detainees, or inmates. It should be understood, however, that the systems and methods described herein may be similarly applicable to other types of controlled-environment facilities and their respective residents (e.g., a hospital and its patients, a school dormitory and its students, etc.).

Figure 1:
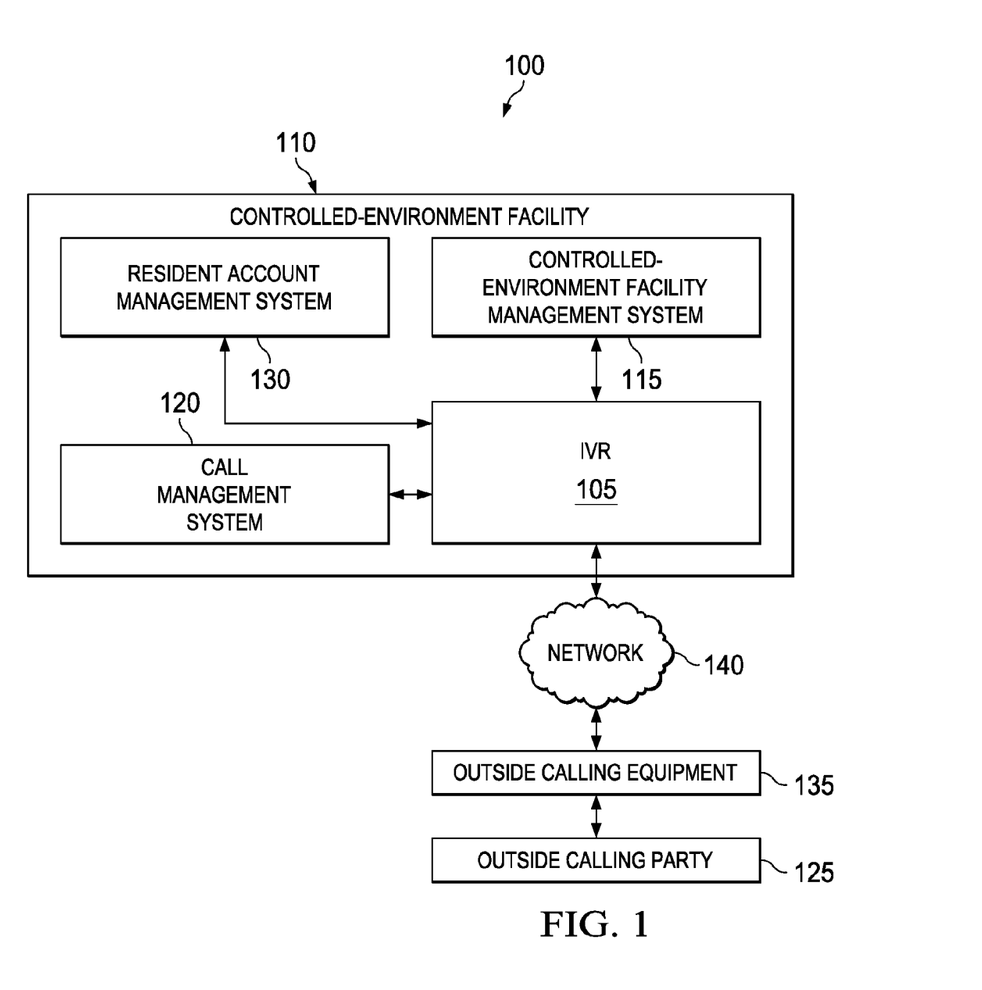
FIG. 1 is a diagrammatic illustration of an example environment, wherein an exemplary Interactive Voice Response system (IVR) is deployed in relation to a controlled-environment facility and its management system, in accordance with some embodiments.

FIG. 1 is a diagrammatic illustration of example environment 100, wherein exemplary IVR system 105 is deployed in relation to controlled-environment facility 110 and its management system 115, in accordance with some embodiments. Controlled-environment facility management functionality 115 hosts resident information and facility information for controlled-environment facility 110, and in accordance with embodiments of the present systems and methods, such resident and/or facility information is selectively provided to outside calling party 125, in an automated manner, via IVR 105. IVR 105 may also be linked with, otherwise associated with, or in some embodiments included in, call management system or functionality 120. Regardless, IVR 105 may include or employ at least one processor and a memory coupled to the processor(s), wherein the memory stores program instructions, which are executable by the at least one processor to implement various embodiments of the present systems and methods. IVR 105 may, in accordance with embodiments of the present systems and methods, also be linked with resident account management system 130, which may administer resident accounts such as resident trust accounts, resident calling accounts, resident discretionary non-trust accounts, resident commissary accounts, and/or the like. Alternatively, or additionally, such accounts may be administered by other systems and/or functionalities, in whole or part. As but one example, resident calling accounts may be administered by call management system or functionality 120 rather than, or in conjunction with, resident account management system 130. Hence, in accordance with embodiments of the present systems and methods, IVR 105 may retrieve and/or provide resident account-related information and/or carry out resident account-related actions, such as through the link(s) to resident account management system(s) 130, and/or other systems.

In accordance with embodiments of the present systems and methods, IVR 105 may selectively provide resident and/or facility information to outside calling party 125. For example, IVR 105 may provide this information during a call to facility 110 by the outside party using equipment 135, which may be a caller's home phone, mobile phone, work phone, a pay phone, or the like. Such a call may be placed via communications and/or data network 140, which may include one or more networks, such as the Internet, an intranet, a public switched telephone network (PSTN), or any other type of communications and/or data network suitable for allowing communication between two entities. Alternatively, outside party 125 may use equipment associated with facility 110, such as a phone associated with controlled-environment facility call management system 120 (e.g., a kiosk or phone in a visitation area of facility 110, or the like). Further, IVR 105 may enable the outside party to pre-arrange visitation with a resident, make deposits in a commissary or trust account of a resident, order or refill prepaid calling cards for a resident, accept credit card information for use in funding a commissary account of a resident, manage a debit or other account associated with a resident, leave a voicemail for the resident, and/or the like. To these ends, IVR 105 may be linked to facility management functionality 115. In one example, this association may be used by a calling friend, family member or other constituent to retrieve the aforementioned information related to a resident and/or the controlled-environment facility itself from controlled-environment facility management system 115, using IVR 105. In accordance with various embodiments of the present systems and methods, wherein controlled-environment facility 110 is a detention facility, such as a jail or correctional facility, controlled-environment facility management system 115 may be a detention facility management system, typically referred to as a Jail Management System (JMS), and the resident may be an inmate. In such embodiments, the retrieved inmate information may be from at least one category including inmate charges, time spent by the resident at the controlled-environment facility, inmate bond amount, inmate bond type, inmate warrant, an inmate hold, inmate visitation times, inmate approved visitors, appointments for the resident, inmate court date, inmate court time, inmate court location, inmate projected release date, inmate identification information, inmate telephone account status, inmate telephone account usage, and/or the like. Also in such embodiments, retrieved facility information might include, facility administrative information, directions to the facility, location of the facility, facility policies for sending mail, facility procedures for sending money, facility visitation policy and hours, facility inmate property storage information, frequently requested phone numbers, and/or the like. In another example, this association of controlled-environment facility management system 115 and IVR 105 may be used to track a resident's activities and use of facility services. This may facilitate setting-up an appointment between an outside party and a resident using IVR 105. For example, facility management system 115 may determine if a resident is eligible or available to take part in an appointment or visitation requested via IVR 105, and schedule the visitation or appointment accordingly.

In accordance with various embodiments of the present systems and methods facility management functionality 115, call management functionality 120, account management system 130, and/or IVR 105 may be located at, or in, facility 110, as illustrated in FIG. 1. However, any of facility management functionality 115, call management functionality 120, account management system 130, and/or IVR 105 may be combined and/or located at a central location outside of the facility, disposed in a decentralized manner at several locations, or otherwise located and/or combined so as to receive or provide telephonic, and/or data communications (including Voice over Internet Protocol (VoIP) calls, or the like) in accordance with the present systems and methods.

In accordance with embodiments of the present systems and methods, when a constituent initially calls into controlled-environment facility IVR 105, touch tone and/or speech recognition driven menus may allow the constituent to speak the name of a resident and/or type of facility information, to self-service themselves without controlled-environment facility staff assistance. IVR 105 may access controlled-environment facility management system 115, call management functionality 120, account management system 130, etc. to provide requested information. In accordance with embodiments of the present systems and methods, IVR 105 may store call origin identifying information, which may be associated with outside calling equipment 135 used to place the call and/or a service provider account used to place the call. Such call origin identifying information may include the Billed Telephone Number (BTN), Automatic Number Identification (ANI), Caller ID, or the like, of such an account, and/or a Media Access Control (MAC) address, Internet Protocol (IP) address, International Mobile Subscriber Identity (IMSI), or the like of outside calling equipment 135. In accordance with such embodiments of the present systems and methods this call origin identifying information may then be associated with identification information of the resident, the type or category of information requested by the calling party and/or actions carried out by the calling party. Thereby, IVR functionality 105 may provide an ability to remember caller information/BTN and provide the same information or service with respect to a particular inmate the next time the party calls, or at least the next time a party calls using the same equipment and/or account. With this ability that remembers the caller by BTN or some other form of information, IVR 105 may ask the caller if they would like to hear resident information for a particular resident, by name or the like, whether the caller would like to perform another transaction of the same type as previously carried-out (e.g. make a deposit), and/or the like. In accordance with various embodiments of the present systems and methods, such options are based on the caller's previous actions completed during their previous call. Hence, the caller would not be required to run-through a lengthy process of identifying the resident or deciding what other options they would like to take, such as performing another transaction. Further, embodiments of the present systems and methods may identify more than one resident the calling party has inquired about and/or funded accounts for, and may present an option to select among those residents in updating information and/or taking other action, such as funding accounts, etc.

Thus, in accordance with implementations of the present systems and methods, a constituent that calls into controlled-environment facility 110 would be directed to IVR 105 and would be recognized by IVR 105 by some type of call origin identifying information, such as a BTN, ANI, Caller ID, IMSI, or the like. Based-off of the identifying information the constituent would be presented different types of options. The presentation of options would be based off the caller's last actions during their last call. For example, in a detention facility implementation, if a caller chose to hear inmate information for "John Doe," made a deposit into his trust account, and left him a voicemail during a previous call, IVR 105 may recognize the caller from the calling BTN, ANI, Caller ID, IMSI or the like and present the caller an option to hear current inmate information for John Doe, before or after also presenting an option to make another deposit to John Doe's trust account and/or leave him a new voicemail. If the caller does not want to take advantage of any of those options, the caller may be presented an option to go through the IVR interactive menus to complete a different action with respect to John Doe or another inmate.

Figure 2:
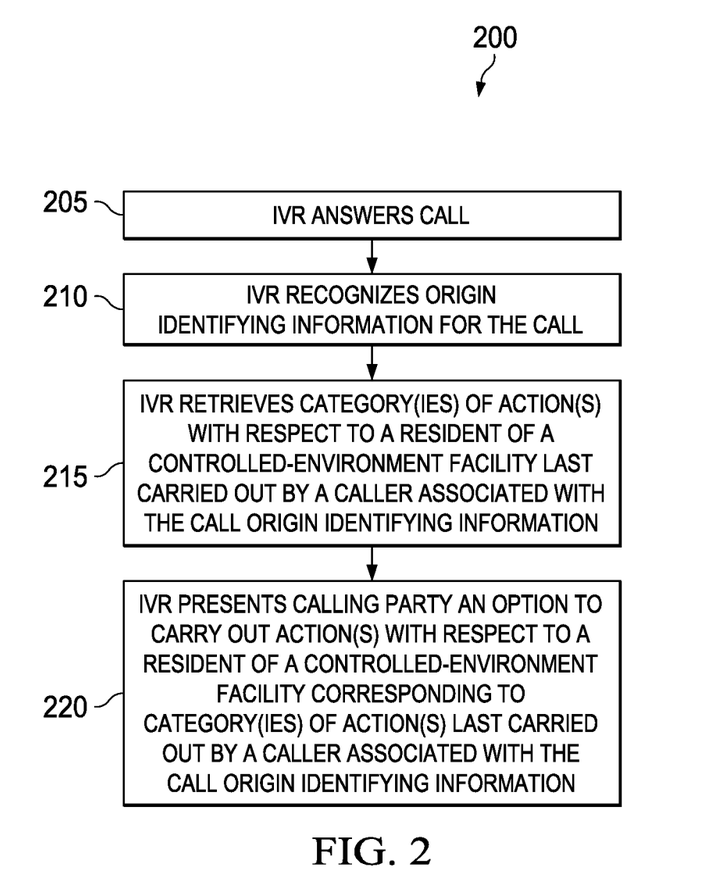
FIG. 2 is a flowchart of an example IVR process for retrieving caller identifying information and providing options for carrying out a same action, or actions, with respect to a particular controlled-environment facility resident as previously carried out by the caller, according to one embodiment.

FIG. 2 is a flowchart of example IVR process 200 for retrieving caller identifying information and providing options for carrying out a same action, or actions, with respect to a particular controlled-environment facility resident as previously carried out by the caller, according to one implementation. Therein, at 205, a controlled-environment facility IVR (105), or the like, may answer a call, recognize the incoming ANI, BTN, Caller ID, IMSI, or the like, at 210, and match it with a most recent previous call at 215. Recognition at 210 may involve recognizing the BTN, or the like, from a database maintained by, or in conjunction with, the IVR. Whereupon, the controlled-environment facility IVR may, at 215, retrieve at least one category of action with respect to at least one resident of a controlled-environment facility that was last carried out by a caller associated with the call origin identifying information recognized at 210.

At 220, the controlled-environment facility IVR may then initiate an IVR message that offers the calling constituent (125) an option to carry out action(s) with respect to the identified resident(s) of the controlled-environment facility, which correspond to the category(ies) of actions last carried out by a caller associated with the call origin identifying information. Various implementations may identify more than one resident the calling party has inquired about and/or carried out actions with respect to, and may present an option to select among those residents for updating information or taking other action.

In one example, the action offered at 220 may be retrieving and hearing current and/or changed information about one or more residents and/or the controlled-environment facility itself, such as from a controlled-environment facility management system. In such an example, the controlled-environment facility (110) may be a detention facility, such as a jail or correctional facility, the controlled-environment facility management system (115) may be, by way of example a JMS, and the resident may be an inmate. The current inmate information retrieved from the JMS and presented to the caller may be from categories such as inmate charges, time spent by the resident at the controlled-environment facility, inmate bond amount, inmate bond type, inmate warrant, inmate hold, inmate visitation times, inmate approved visitors, appointments for the resident, inmate court date, inmate court time, inmate court location, inmate projected release date, inmate identification information, inmate telephone account status, inmate telephone account usage, and/or the like. Also in such embodiments, retrieved facility information might be, facility administrative information, directions to the facility, location of the facility, facility policies for sending mail, facility procedures for sending money, facility visitation policy and hours, facility inmate property storage information, frequently requested phone numbers, and/or the like.

In other examples, the action offered at 220 may, alternatively or additionally, be depositing money to an account maintained for the benefit of the identified resident(s) (such as by resident account management system 130), leaving a voicemail for the resident(s) (such as using call management system 120), setting-up an appointment or visitation between an outside party and the resident, and/or the like.

Figure 3:
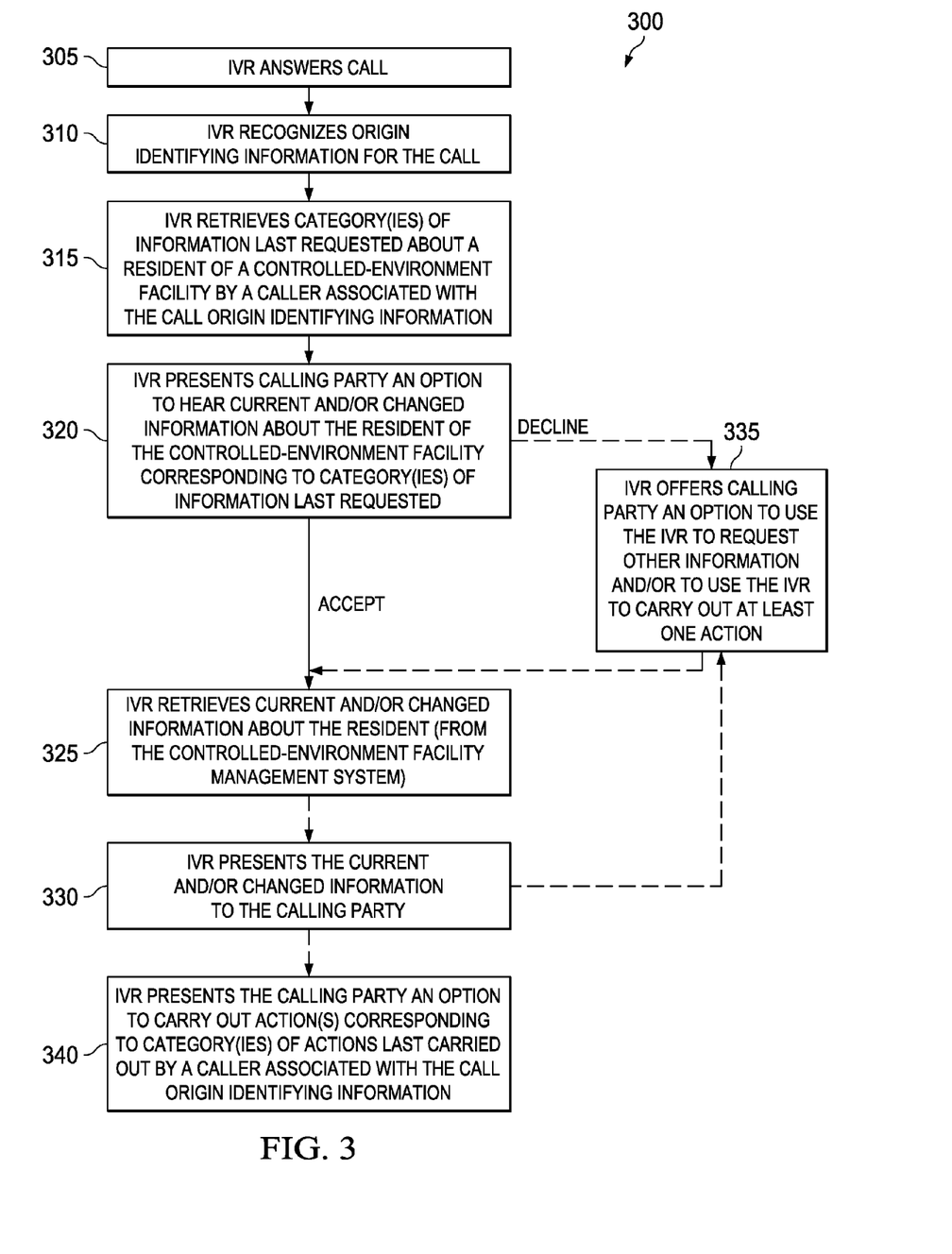
FIG. 3 is a flowchart of an example IVR process for retrieving caller identifying information and providing options for hearing a same category of information for a particular controlled-environment facility resident as previously requested by the caller, according to one embodiment.

FIG. 3 is a flowchart of example IVR process 300 for retrieving caller identifying information and providing options for hearing a same category of information for a particular controlled-environment facility resident as previously requested by the caller, according to one implementation. Therein, an IVR (105) may answer a call at 305 and at 310 recognize call origin identifying information associated with the call (135), such as by recognizing the BTN, ANI, Caller ID, IMSI, or the like from a database maintained by, or in conjunction with, the IVR. Whereupon, the IVR may retrieve at least one category of information last requested about a resident of a controlled-environment facility by a caller associated with the call origin identifying information at 315, and at 320 presents the calling party (125) an option to hear current and/or changed information about the resident of the controlled-environment facility corresponding to the category(s) of information last requested. The current and/or changed information about the resident of the controlled-environment facility may be retrieved by querying a controlled-environment facility management system (115) for the current and/or changed information at 325, or earlier, such as at 315 when the category(ies) of information last requested about the resident were retrieved. A resident account management system (130) may also be queried for certain types of current and/or changed resident information, such as account balances or the like. Thereafter, the current and/or changed information may be presented to the calling party at 330, by the IVR, such as in response to selection of the option to hear current information about the resident of the controlled-environment facility presented at 320. Further implementations may identify more than one resident that the calling party has inquired about, funded accounts for, and/or the like, and may present an option to select among those residents.

Such implementations may, additionally or alternatively, present the calling party an option to use the IVR recognition system to request other information from at least one category of information at 335 such as following presentation of the retrieved information at 330, or such as in response to selection of an option to not hear current and/or changed information about the resident of the controlled-environment facility at step 320. Additionally or alternatively, such implementations may present the calling party an option to carry out at least one action corresponding to at least one category of actions last carried out by a caller associated with the call origin identifying information, such as at 340. Such an action may be, by way of example, depositing money to an account maintained for the benefit of the resident of the controlled-environment facility, or the like.

Figure 4:
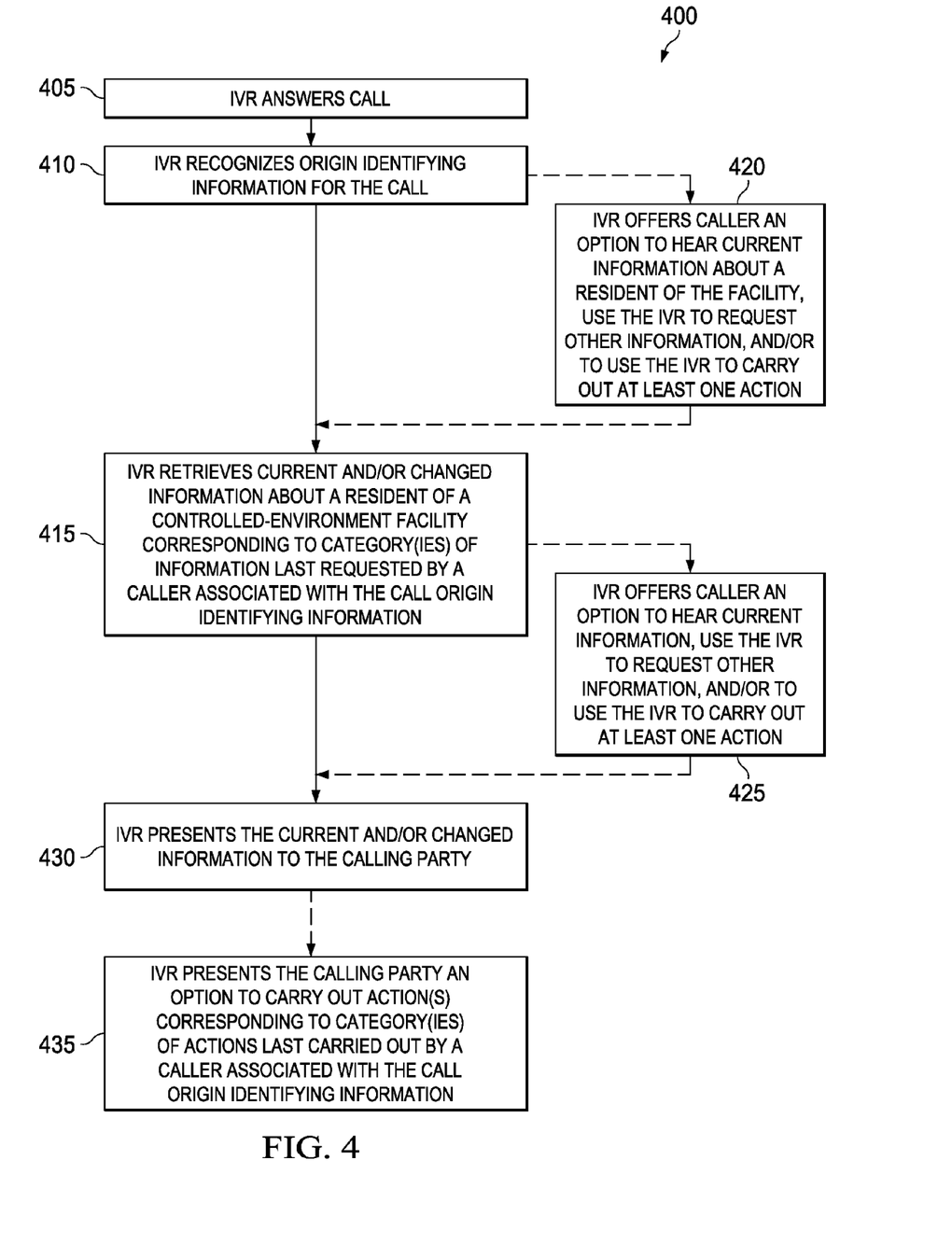
FIG. 4 is a flowchart of an example IVR process for retrieving caller identifying information and providing information from a same category for a particular controlled-environment facility resident as previously requested by the caller, according to one embodiment.

FIG. 4 is a flowchart of example IVR process 400 for retrieving caller identifying information and providing information from a same category for a particular controlled-environment facility resident as previously requested by the caller, according to one implementation. Therein, a call is answered using an IVR at 405, such as by controlled-environment facility IVR 105. The IVR recognizes call origin identifying information associated with equipment placing the call at 410, such as by recognizing a BTN, ANI, Caller ID, IMSI, or the like associated with the call. Then at 415, the IVR retrieves current information about a resident of a controlled-environment facility corresponding to at least one category of information last requested by a caller associated with the call origin identifying information. Retrieving such current information about the resident of the controlled-environment facility may comprise querying a controlled-environment facility management system, such as controlled-environment facility management system 115 and/or querying a resident account management system (130), for the current and/or changed information.

In some implementations, before, or after, retrieving the current information at 415, calling party 125 may, at 420 or 425, be offered an option to hear the current information, afforded an option to use the interactive voice recognition system to request other information from at least one category of information, and/or an option to use the interactive voice recognition system to carry out at least one action, such as an action previously carried out by the party, or not.

In any case, after retrieval of information, such as at 415, the IVR may present the current information to the calling party at 430. The IVR may additionally or alternatively, present the calling party an option to carry out actions corresponding to at least one category of actions last carried out by a caller associated with the call origin identifying information, at 435, such as an option to deposit money to an account maintained for the benefit of the resident, leave a voicemail for the resident, and/or the like. Further implementations may identify more than one resident that the calling party has inquired about, funded accounts for, and/or the like, and may present an option to select among those residents for hearing current information of carrying-out other action(s).

Hence, embodiments of the present systems and methods, address problems present with current controlled-environment facility automated information systems presented using IVR functionality or the like. For example, the present systems and methods diminish problems with interactive response trees becoming longer in the presence of voice recognition problems in IVRs, by using the calling party's BTN, ANI, Caller ID or the like, to jump to a last looked-up resident name and offering the caller options to retrieve information for that resident and/or an option to take other actions such as funding the resident's accounts, leaving a voicemail, or the like. Further, since the controlled-environment facility management system can provide information as to whether a resident has a trust account or the like, regardless of whether the caller funded the account in the immediately preceding call, an offer to fund such an account can be made, such as following retrieval of information about the resident. Hence, in accordance with embodiments of the present systems and methods, a call placed by a resident's constituent may be answered and addressed by an IVR (105) as follows: "We know what you heard last time about John Doe. Do you want to hear what changed since the last time you called, do you want to hear status changes that happened in the last 10 days, do you want to hear the same thing, or do you want to hear all current and changed information about John Doe?" Further, even though the above-described embodiments and implementations of the present systems and methods generally only mention a single resident, embodiments and implementations of the present systems and methods may identify more than one resident the calling party has inquired about, funded accounts for, and/or the like, and may present an option to select among those residents, as noted. Hence, embodiments and implementations of the present systems and methods provide the caller a more personal experience and may make the caller more likely to call in and fund accounts, since the hassle related with doing so is reduced, enhancing revenue for the controlled-environment facility and/or associated vendors, such as by quickening conversion from contact to funding of account and/or generally facilitating funding of accounts. Further, since embodiments and implementations of the present systems and methods may identify more than one resident the calling party has inquired about, non-family constituents (such as attorneys, bail bondsmen, or the like, in detention facility embodiment or implementations) may be able to make particular use of such an option to select among previously-inquired about residents/clients.

Similarly, recognition of the BTN, ANI, Caller ID or the like, such as 210, 310, 410 may further involve identifying the current calling number as one of a group of phone numbers associated with inquires or actions with respect to a particular resident or group of residents. For example, if an outside party has called from different phones, a work telephone, cell phone, home phone, etc., and inquired about a same resident or group of residents, when a person calls from any of those phones, embodiments or implementations of the present systems and methods may recognize the phone as calling about the same resident(s) and carry out process 200, 300, 400 or the like, accordingly.

In accordance with various further embodiments or implementations of the present systems and methods, notifications of controlled-environment facility resident changes may be provided via phone, email, SMS notifications, or the like, as updated inmate information, to paid and/or unpaid subscribers, which may include friends, family, and/or other constituents. Typically, changes in bond information, charges, movements, etc. are only communicated to constituents via inmate, and sometimes via facility, such as discussed above. These further embodiments or implementations afford an ability to provide immediate communication of pertinent and important resident and facility information to paid (cost for a subscription may be per resident) and/or unpaid subscribers (friends, family, attorneys, concerned constituents, bail bondsmen, and the press, among others, in detention facility implementations). With such notifications, any change made to a resident's information hosted by a JMS or other controlled-environment management system, can be communicated to a subscriber. In addition, such embodiments provide an ability or avenue for facilities to broadcast important information to multiple subscribers, such as friends and family, attorneys, concerned constituents, bail bondsmen and the press, among others. In accordance with such embodiments, a constituent may be offered an opportunity to subscribe to such notifications for a particular resident, such as during a call to inquire about the resident, fund his or her account(s), and/or the like. Thereafter, when changes with respect to that resident in the controlled-environment facility management system occur a notification message to the subscriber is triggered. As noted, such notifications may take the form of a phone call (such as may be initiated and carried out by IVR 105), an email (such as may be sent by controlled-environment facility management functionality 115), an SMS text such as may be sent by call management system 120), or the like. In accordance with various embodiments, the message may contain such information on the change in status, information, or the like, as the notification medium will afford. For example, an SMS text may only include a brief statement of the nature of the new status, while an email may detail the former status as well as presenting the new status and any related information, Internet links, or such. Similarly, a notification call by IVR 105, may in accordance with the present systems and methods, afford the subscriber an opportunity to acquire further information about the resident using IVR 105, such as during the same call to the subscriber. To this end, IVR 105 may facilitate repetition of a last requested action in accordance with the present systems and methods and/or offer to facilitate an action related to the changed status or information during the call to the subscriber.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:
answering a call from a calling party, using a controlled-environment facility interactive voice response system;
recognizing call origin identifying information associated with the call, by the controlled-environment facility interactive voice response system;
retrieving, by the controlled-environment facility interactive voice response system, at least one category of action with respect to a resident of a controlled-environment facility last carried out by a caller associated with the call origin identifying information; and
presenting, by the controlled-environment facility interactive voice response system, the calling party an option to carry out at least one action with respect to a resident of a controlled-environment facility corresponding to at least one category of at least one action last carried out by a caller associated with the call origin identifying information and an option to request information from at least one category of information.

2. The method of claim 1, wherein the at least one action is depositing money to an account maintained for the benefit of the resident of the controlled-environment facility.

3. The method of claim 1, wherein the at least one action comprises at least hearing current information about the resident.

4. The method of claim 1, wherein the at least one action comprises at least retrieving current information about a resident corresponding to information last requested by a caller associated with the call origin identifying information and information about the resident that has changed since a last call associated with the call origin identifying information from a controlled-environment facility management system and presenting at least one of the current resident information or the resident information that has changed since a last call associated with the identifying information, to the calling party.

5. The method of claim 4, wherein the controlled-environment facility is a detention facility, the controlled-environment facility management system is a detention facility management system and the resident is an inmate.

6. An interactive voice response system comprising:
at least one processor; and
a memory coupled to the at least one processor, wherein the memory stores program instructions, and wherein the program instructions are executable by the at least one processor to:
interactively answer a call from a calling party;
recognize call origin identifying information associated with the call;
retrieve at least one category of information last requested about a resident of a controlled-environment facility by a caller associated with the call origin identifying information; and
present the calling party an option to hear current information about the resident of the controlled-environment facility corresponding to the at least one category of information last requested and an option to hear information about the resident that has changed since a last call associated with the call origin identifying information.

7. The interactive voice response system of claim 6, wherein the program instructions are further executable by the at least one processor to retrieve and present to the calling party at least one of the current information in response to selection of the option to hear the current information about the resident of the controlled-environment facility or the information that has changed since a last call associated with the call origin identifying information in response to selection of the information that has changed since a last call associated with the call origin identifying information.

8. The interactive voice response system of claim 7, wherein the program instructions are further executable by the at least one processor to query a controlled-environment facility management system for resident information to retrieve at least one of the current information about the resident of the controlled-environment facility or the information about the resident that has changed since a last call associated with the call origin identifying information.

9. The interactive voice response system of claim 8, wherein the controlled-environment facility is a detention facility, the controlled-environment facility management system is a detention facility management system, and the resident is an inmate.

10. The interactive voice response system of claim 6, wherein the program instructions are further executable by the at least one processor to present the calling party the option to request other information from at least one category of information, in response to selection of an option to not hear at least one of current information about the resident of the controlled-environment facility or information about the resident that has changed since a last call associated with the call origin identifying information.

11. The interactive voice response system of claim 6, wherein the program instructions are further executable by the at least one processor to present the calling party an option to carry out at least one action corresponding to at least one category of actions last carried out by a caller associated with the call origin identifying information.

12. The interactive voice response system of claim 11, wherein the at least one action is depositing money to an account maintained for the benefit of the resident of the controlled-environment facility.

13. A tangible non-transitory computer-readable storage medium having program instructions stored thereon that, upon execution by an interactive voice response system, cause the interactive voice response system to:
  interactively answer a call from a calling party;
  recognize identifying information associated with the call;
  retrieve current information about a resident of a controlled-environment facility corresponding to at least one category of information last requested by a caller associated with the identifying information and information about the resident that has changed since a last call associated with the call origin identifying information; and
  present at least one of the current resident information or the resident information that has changed since a last call associated with the call origin identifying information, to the calling party.

14. The tangible non-transitory computer-readable storage medium of claim 13, the program instructions further executable by the interactive voice response system to, prior to presenting at least one of the current resident information or the resident information that has changed since a last call associated with the call origin identifying information, present the calling party an option to hear at least one of the current resident information or the resident information that has changed since a last call associated with the call origin identifying information.

15. The tangible non-transitory computer-readable storage medium of claim 13, the program instructions further executable by the interactive voice response system to present the calling party an option to use the interactive voice recognition system to request other information from at least one category of information.

16. The tangible non-transitory computer-readable storage medium of claim 15, the program instructions further executable by the interactive voice response system to present the option to use the interactive voice recognition system to request other information before presenting at least one of the current resident information or the resident information that has changed since a last call associated with the call origin identifying information to the party.

17. The tangible non-transitory computer-readable storage medium of claim 13, the program instructions further executable by the interactive voice response system to present the calling party an option to use the interactive voice recognition system to carry out at least one action not previously carried out by a party associated with call origin the identifying information.

18. The tangible non-transitory computer-readable storage medium of claim 13, the program instructions further executable by the interactive voice response system to present the option to use the interactive voice recognition system to carry out at least one action not previously carried out by a party associated with the identifying information before presenting the information that has changed since a last call associated with the call origin identifying information to the party.

19. The tangible non-transitory computer-readable storage medium of claim 13, the program instructions further executable by the interactive voice response system to present the calling party associated with the call origin identifying information an option to carry out actions corresponding to at least one category of actions last carried out by a caller associated with the call origin identifying information.

20. The tangible non-transitory computer-readable storage medium of claim 13, wherein the at least one action is depositing money to an account maintained for the benefit of the resident of the controlled-environment facility.

21. The tangible non-transitory computer-readable storage medium of claim 13, the program instructions further executable by the interactive voice response system to retrieve at least one of the current information about the resident of the controlled-environment facility or and/or the information about the resident that has changed since a last call associated with the call origin identifying information, by querying a controlled-environment facility management system for the information.

22. The tangible non-transitory computer-readable storage medium of claim 13, wherein the controlled-environment facility is a detention facility, the controlled-environment facility management system is a detention facility management system, and the resident is an inmate.

* * * * *